(12) United States Patent
Rosario

(10) Patent No.: US 11,259,629 B1
(45) Date of Patent: Mar. 1, 2022

(54) VEHICLE TRUNK TABLE

(71) Applicant: Ari Rosario, Tampa, FL (US)

(72) Inventor: Ari Rosario, Tampa, FL (US)

(*) Notice: Subject to any disclaimer, the term of this patent is extended or adjusted under 35 U.S.C. 154(b) by 0 days.

(21) Appl. No.: 16/940,441

(22) Filed: Jul. 28, 2020

(51) Int. Cl.
*A47B 3/10* (2006.01)
*A47B 3/087* (2006.01)
*B60N 3/00* (2006.01)

(52) U.S. Cl.
CPC .............. *A47B 3/10* (2013.01); *A47B 3/087* (2013.01); *B60N 3/001* (2013.01)

(58) Field of Classification Search
CPC .. A47B 31/06; A47B 3/10; A47B 3/14; A47B 3/087; B60N 3/001
USPC ................................................. 108/44, 132
See application file for complete search history.

(56) References Cited

U.S. PATENT DOCUMENTS

| | | | | |
|---|---|---|---|---|
| 2,889,097 A * | 6/1959 | Broehl | ..................... | B60R 5/044 224/542 |
| 3,063,064 A * | 11/1962 | Mace | ..................... | B60N 2/2854 5/94 |
| 3,338,620 A * | 8/1967 | Cauvin | ..................... | B60P 3/32 296/37.14 |
| 4,962,709 A * | 10/1990 | Huber | ..................... | B60N 3/001 108/27 |
| 5,090,335 A | 2/1992 | Russell | | |
| 5,329,979 A | 7/1994 | Miller | | |
| 5,441,183 A * | 8/1995 | Frenzel | ..................... | B60R 7/02 224/542 |
| 5,443,019 A * | 8/1995 | Sheldrick | ................. | B25H 5/00 108/44 |
| 5,598,962 A * | 2/1997 | Schlachter | ............. | B60R 5/045 224/542 |
| 5,992,331 A | 11/1999 | Inoue | | |
| 6,050,202 A * | 4/2000 | Thompson | ............. | B60N 3/001 108/144.11 |
| 6,062,146 A * | 5/2000 | Conners | ................. | B60R 5/045 108/44 |
| 6,092,708 A * | 7/2000 | Rand | ...................... | B60R 11/00 108/147.21 |
| D462,196 S | 9/2002 | Holub | | |
| 6,942,269 B2 * | 9/2005 | Mains | .................... | B60N 3/001 108/44 |
| 8,424,946 B2 | 4/2013 | Newberg | | |
| 10,232,793 B2 * | 3/2019 | Frederick | ............... | B60R 13/01 |
| 10,336,261 B2 * | 7/2019 | White | ..................... | B60R 5/045 |
| 10,913,384 B2 * | 2/2021 | Hunter | .................... | A47K 3/32 |

(Continued)

FOREIGN PATENT DOCUMENTS

WO    2009029927    3/2009

*Primary Examiner* — Jose V Chen

(57) ABSTRACT

The vehicle trunk table is a folding table. The vehicle trunk table is formed with a form factor such that the will fit flush within the footprint of a trunk floor. The vehicle trunk table forms a raised supporting surface that covers the trunk floor. The vehicle trunk table is customized for an individual make and model of a vehicle. The vehicle trunk table can be extended to form a table. The vehicle trunk table includes a first leaf, a second leaf, a first support, a second support, and a hinge. The hinge attaches the first leaf and the second leaf. The first leaf and the second leaf from a flush horizontal surface that forms the superior surface of the vehicle trunk table. The first support and the second support raise the first leaf and the second leaf above the supporting surface.

12 Claims, 5 Drawing Sheets

(56) References Cited

U.S. PATENT DOCUMENTS

| | | | |
|---|---|---|---|
| 2002/0109368 A1* | 8/2002 | Mink | B60P 1/003 |
| | | | 296/26.13 |
| 2003/0075943 A1* | 4/2003 | Kirchhoff | B62D 33/0273 |
| | | | 296/26.11 |
| 2004/0056059 A1* | 3/2004 | Delgado | B60R 5/045 |
| | | | 224/499 |
| 2006/0196395 A1* | 9/2006 | Lin | A47B 3/087 |
| | | | 108/132 |
| 2012/0024203 A1* | 2/2012 | Winter | A47B 3/0912 |
| | | | 108/132 |
| 2014/0116301 A1* | 5/2014 | Tsai | A47B 13/083 |
| | | | 108/169 |
| 2018/0072208 A1* | 3/2018 | Howe | A47B 5/04 |

* cited by examiner

VEHICLE TRUNK TABLE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transporting and vehicles including vehicle accommodation not otherwise provided for, more specifically, a folding table configured for use with a vehicle.

SUMMARY OF INVENTION

The vehicle trunk table is a folding table. The vehicle trunk table is configured for use with a vehicle. The vehicle is further defined with a trunk. The trunk is further defined with a trunk floor. The trunk floor forms the supporting surface of the trunk. The vehicle trunk table is formed with a form factor such that the will fit flush within the footprint of the trunk floor. The vehicle trunk table forms a raised supporting surface that completely covers and substitutes for the trunk floor. The vehicle table is customized for an individual make and model of a vehicle. When the vehicle trunk table is removed from the trunk, the vehicle trunk table can be extended to form a table. The vehicle trunk table comprises a first leaf, a second leaf, a first support, a second support, and a hinge. The hinge attaches the first leaf and the second leaf. The first leaf and the second leaf from a flush horizontal surface that forms the superior surface of the vehicle trunk table. The first support and the second support raise the first leaf and the second leaf above the supporting surface.

These together with additional objects, features and advantages of the vehicle trunk table will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle trunk table in detail, it is to be understood that the vehicle trunk table is not limited in its applications to the details of construction and arrangements of the components set forth in the following description or illustration. Those skilled in the art will appreciate that the concept of the disclosure may be readily utilized as a basis for the design of other structures, methods, and systems for carrying out the several purposes of the vehicle trunk table.

It is therefore important that the claims be regarded as including such equivalent construction insofar as they do not depart from the spirit and scope of the vehicle trunk table. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
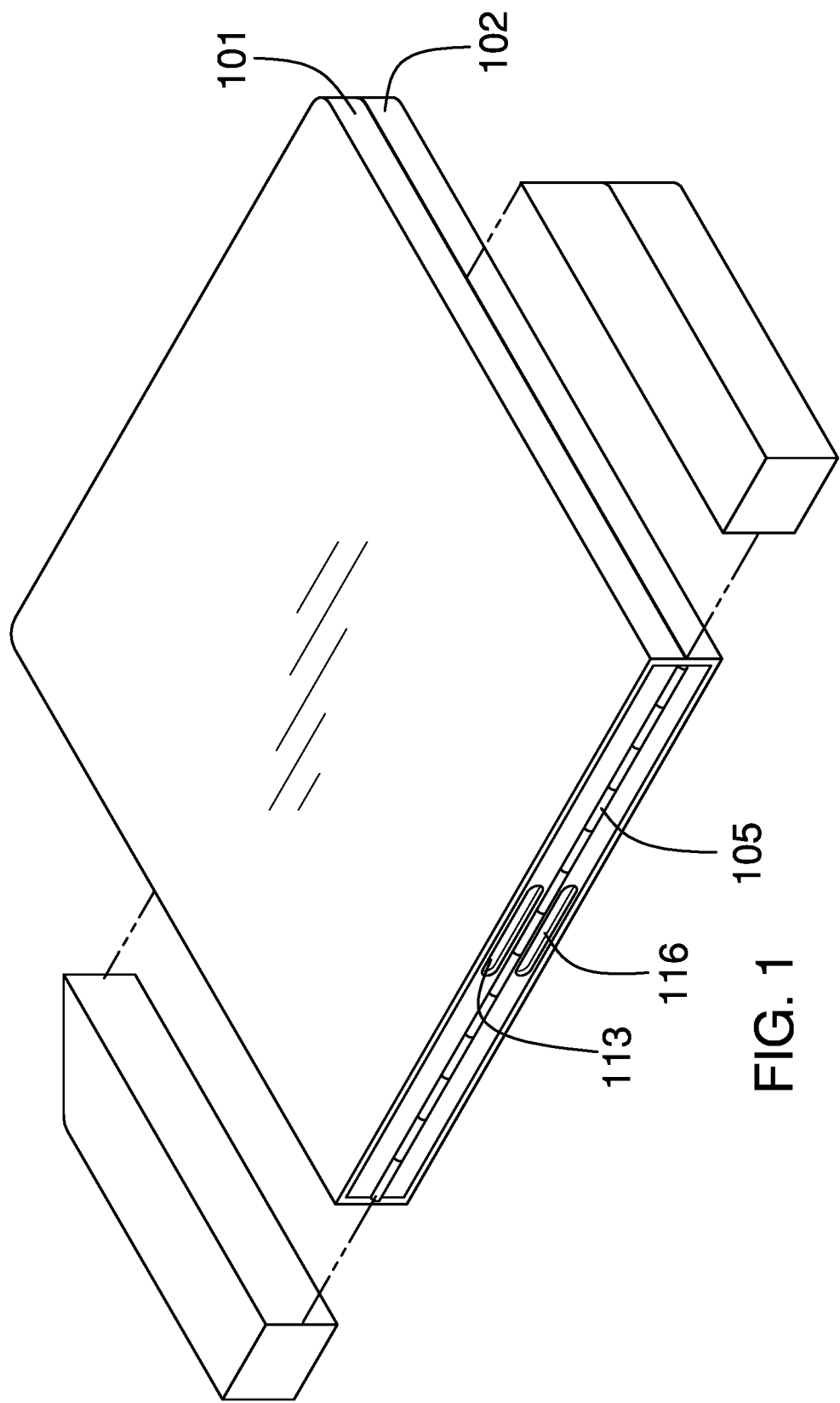
FIG. 1 is a perspective view of an embodiment of the disclosure.
Figure 2:
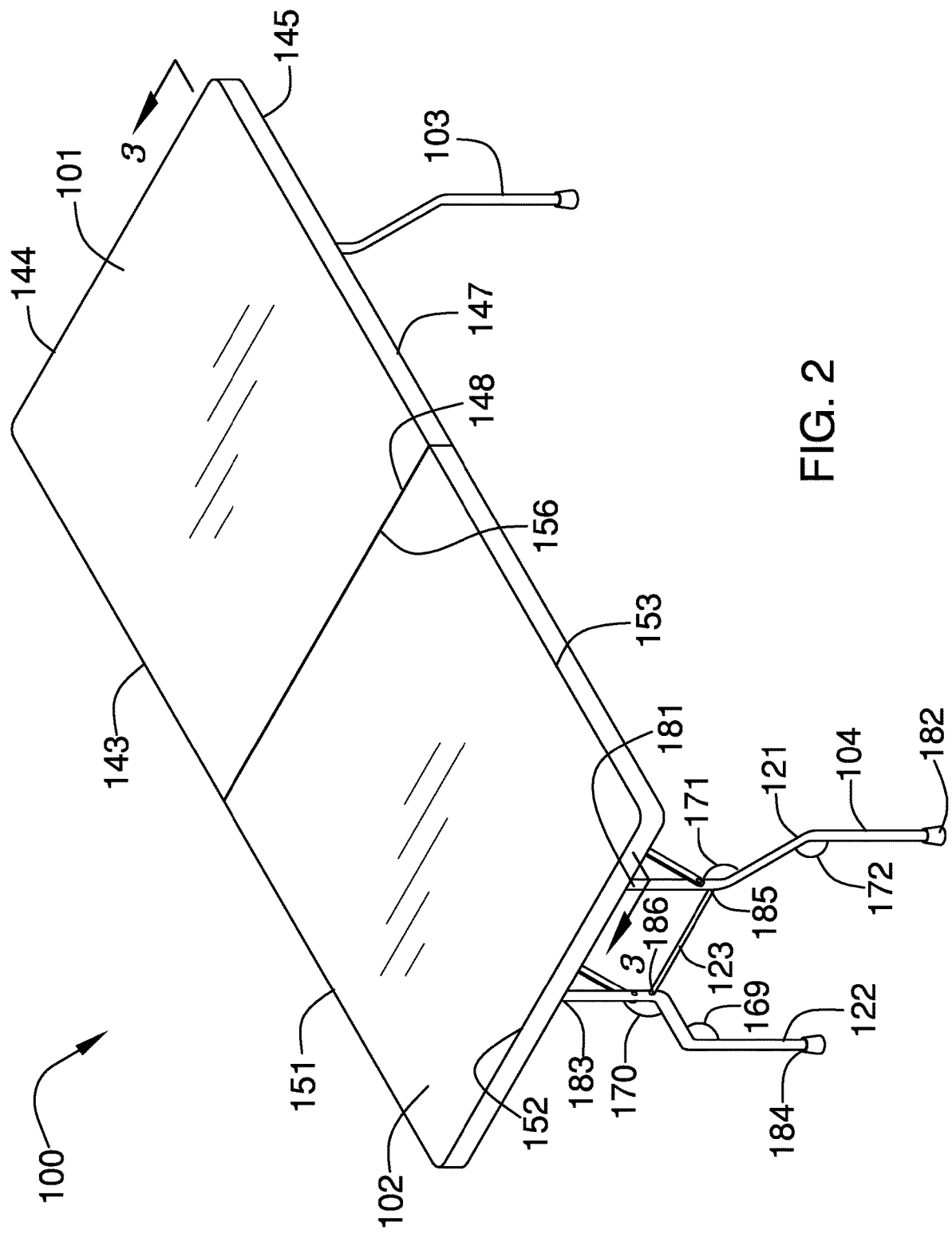
FIG. 2 is a perspective view of an embodiment of the disclosure.
Figure 3:
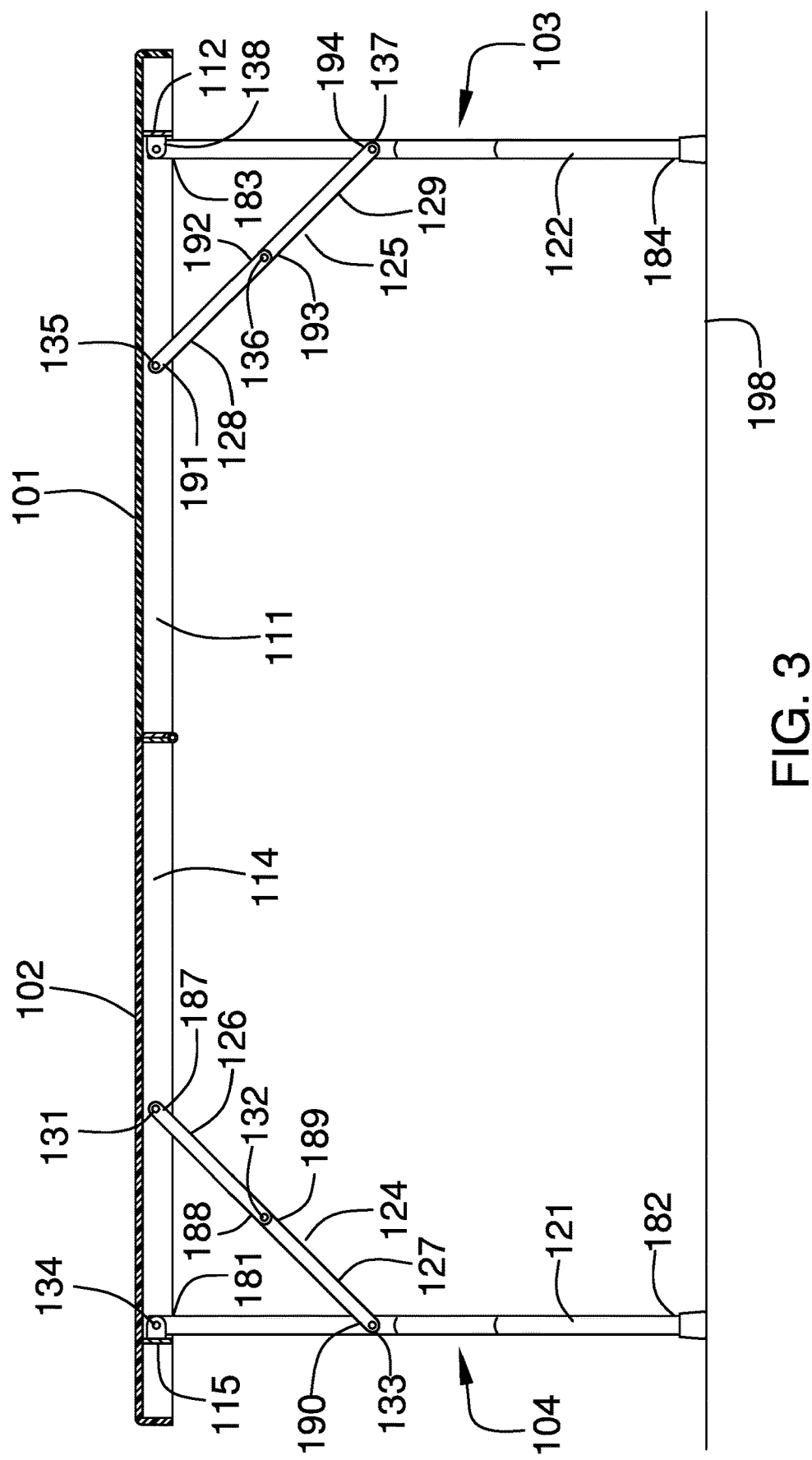
FIG. 3 is a cross-sectional view of an embodiment of the disclosure across 3-3 as shown in FIG. 1.
Figure 4:
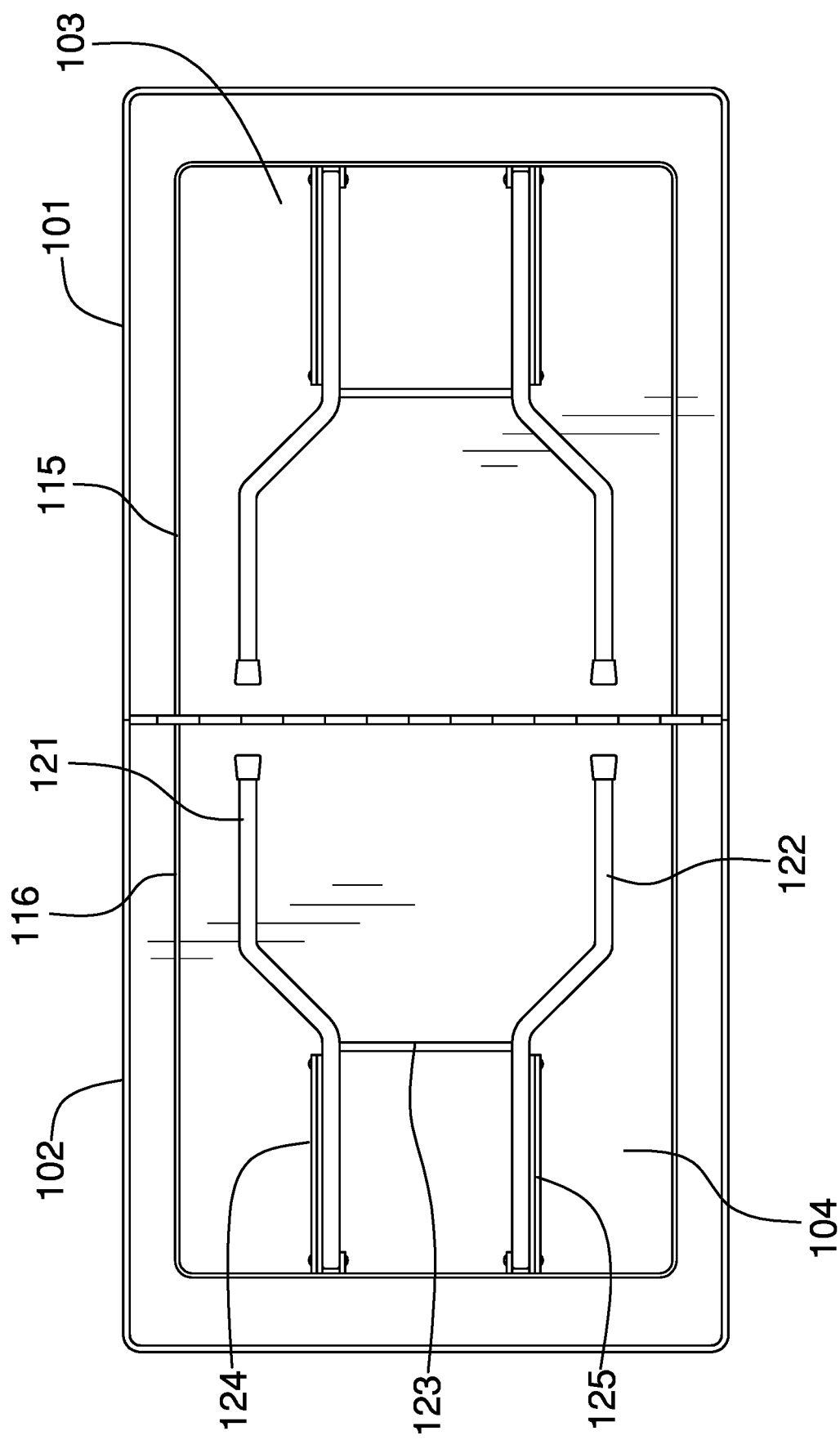
FIG. 4 is a bottom view of an embodiment of the disclosure.
Figure 5:
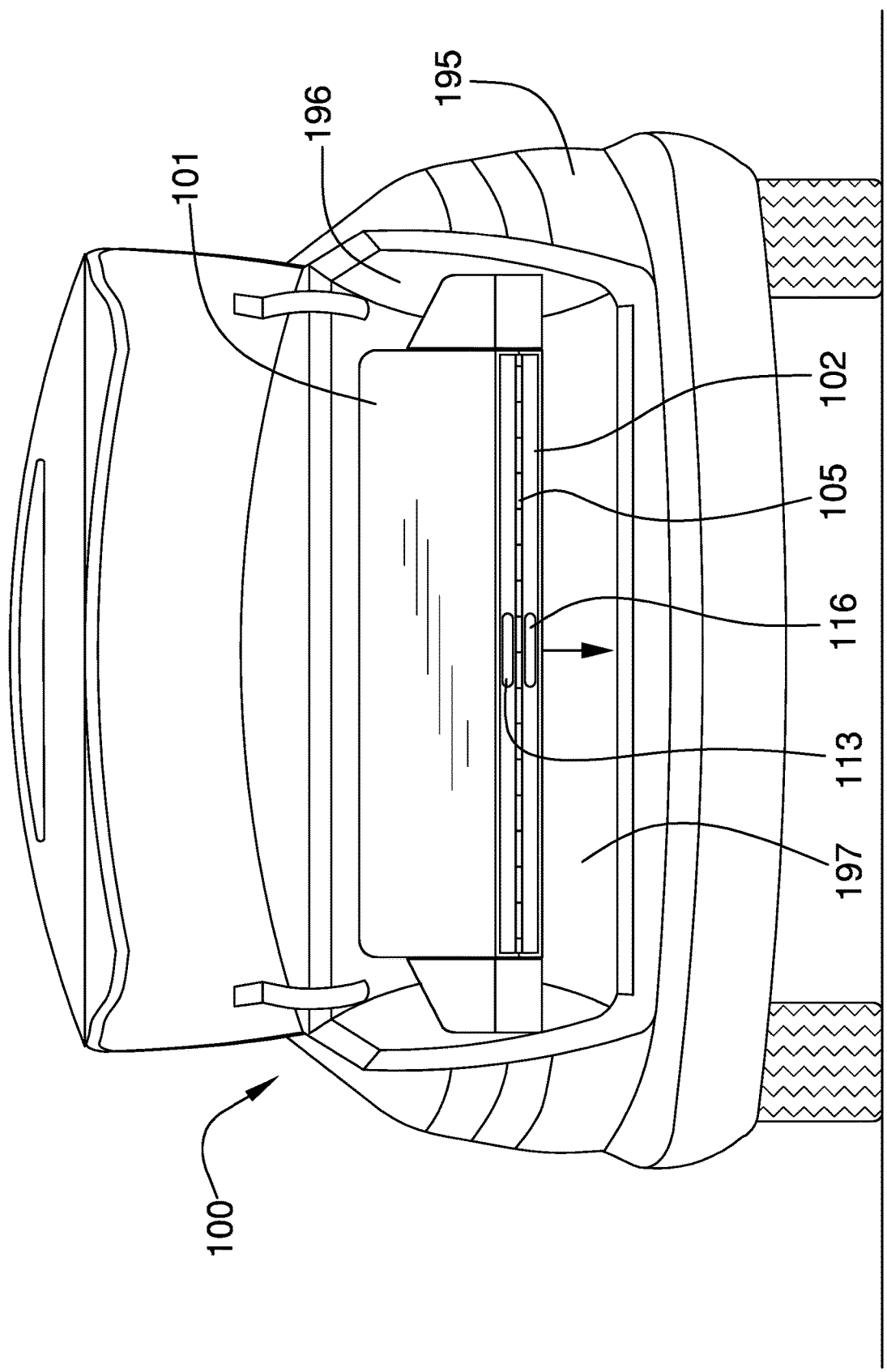
FIG. 5 is an in use view of an embodiment of the disclosure.

Detailed reference will now be made to one or more potential embodiments of the disclosure, which are illustrated in FIGS. 1 through 5.

The vehicle trunk table 100 (hereinafter invention) is a folding table. The invention 100 is configured for use with a vehicle 195. The vehicle 195 refers to a motorized device that transports cargo on a road network. It is assumed that the vehicle 195 is an automobile. The vehicle 195 is further defined with a trunk 196. The trunk 196 refers to a traditional space located in the rear of the vehicle 195. The trunk 196 is further defined with a trunk floor 197. The trunk floor 197 forms the bottom surface of the trunk 196. The invention 100 is formed with a form factor such that the will fit flush within the footprint of the trunk floor 197. The invention 100 forms a raised bottom surface that completely covers and substitutes for the trunk floor 197.

The invention 100 is customized for an individual make and model of a vehicle 195. When the invention 100 is removed from the trunk 196, the invention 100 can be deployed to form a table. The invention 100 comprises a first leaf 101, a second leaf 102, a first support 103, a second support 104, and a hinge 105. The hinge 105 attaches the first leaf 101 and the second leaf 102. The first leaf 101 and the second leaf 102 from a flush horizontal surface that forms the superior surface of the invention 100. The first support 103 and the second support 104 raise the first leaf 101 and the second leaf 102 above the supporting surface 198. The supporting surface 198 refers to a surface upon which the invention 100 is placed.

The first leaf 101 is a hollow rectilinear block structure. An open face of the first leaf 101 provides access into the hollow interior. When the invention 100 is deployed normally, the open face of the first leaf 101 is the inferior face. The first leaf 101 combines with the second leaf 102 to form a flush horizontal superior surface of the invention 100 in the manner of a table. The first leaf 101 is created with a form factor that aligns with the trunk floor 197 such that the first leaf 101 will fit in a flush manner with the trunk floor 197 during storage.

The first leaf 101 comprises a first cavity 111, a first ring 112, and a first handle 113. The first leaf 101 is further defined with a third edge 143, a fourth edge 144, a fifth edge 145, a sixth edge 146, a seventh edge 147, and an eighth edge 148.

The first cavity 111 refers to the hollow interior space formed by the first ring 112 of the first leaf 101. The first ring 112 is a metal ridge structure that forms a loop that forms the exterior surfaces of the first leaf 101 with the exception of the superior surface of the first leaf 101. The first ring 112: 1) provides structural support for the invention 100; and, 2) provides anchor points for the attachment of the first support 103 to the first leaf 101. The first handle 113 is an aperture that is formed in the eighth edge 148 of the first leaf 101. The first handle 113 acts as a grip.

The second leaf 102 is a hollow rectilinear block structure. An open face of the second leaf 102 provides access into the hollow interior. When the invention 100 is deployed normally, the open face of the second leaf 102 is the inferior face. The second leaf 102 combines with the first leaf 101 to form a flush horizontal superior surface of the invention 100 in the manner of a table. The second leaf 102 is created with a form factor that aligns with the trunk floor 197 such that the second leaf 102 will fit in a flush manner with the trunk floor 197 during storage. The second leaf 102 is identical to the first leaf 101 such that the first leaf 101 and the second leaf 102 form a symmetrical surface when the invention 100 is deployed. When the invention 100 is folded for storage, the second leaf 102 aligns with the first leaf 101 to form a unified rectilinear structure with flush surfaces.

The second leaf 102 comprises a second cavity 114, a second ring 115, and a second handle 116. The second leaf 102 is further defined with a ninth edge 149, a tenth edge 150, an eleventh edge 151, a twelfth edge 152, a thirteenth edge 153, a fourteenth edge 154, a fifteenth edge 155, and a sixteenth edge 156. The second leaf 102 is further defined with a fifth angle 165, a sixth angle 166, a seventh angle 167, and an eighth angle 168.

The second cavity 114 refers to the hollow interior space formed by the second ring 115 of the second leaf 102. The second ring 115 is a metal ridge structure that forms a loop that forms the exterior surfaces of the second leaf 102 with the exception of the superior surface of the second leaf 102. The second ring 115: 1) provides structural support for the invention 100; and, 2) provides anchor points for the attachment of the second support 104 to the second leaf 102. The second handle 116 is an aperture that is formed in the sixteenth edge 156 of the second leaf 102. The second handle 116 acts as a grip.

The fifth angle 165 is an interior angle formed within the perimeter of the second leaf 102. The sixth angle 166 is an exterior angle formed within the perimeter of the second leaf 102. The seventh angle 167 is an exterior angle formed within the perimeter of the second leaf 102. The eighth angle 168 is an interior angle formed within the perimeter of the second leaf 102.

The fifth angle 165 is formed at the vertex of the ninth edge 149 and the tenth edge 150. The sixth angle 166 is formed at the vertex of the tenth edge 150 and the eleventh edge 151. The seventh angle 167 is formed at the vertex of the thirteenth edge 153 and the fourteenth edge 154. The eighth angle 168 is formed at the vertex of the fourteenth edge 154 and the fifteenth edge 155.

The hinge 105 readily and commercially available piano hinge that attaches the first leaf 101 to the second leaf 102 such that the first leaf 101 can rotate relative to the second leaf 102.

The first support 103 is a structural component of the invention 100 that provides a load path from the first leaf 101 to the supporting surface 198 upon which the invention 100 is placed during deployment.

The first support 103 is identical to the second support 104. Within this disclosure, the second support 104 and the attachment of the second support 104 to the second leaf 102 will be discussed in detail with the understanding that the first support 103 will be assembled in an identical manner to the second support 104 and that the first support 103 will attach to the first leaf 101 in the same manner as the second support 104 attaches to the second leaf 102.

The second support 104 is a structural component of the invention 100 that provides a load path from the second leaf 102 to the supporting surface 198 upon which the invention 100 is placed during deployment.

The second support 104 comprises a first leg 121, a second leg 122, a cross brace 123, a first folding joist 124, a second folding joist 125, a fourth pivot 134, and an eighth pivot 138. The first leg 121 is further defined with a first end 181, a second end 182, an eleventh angle 171, and a twelfth angle 172. The second leg 122 is further defined with a third end 183, a fourth end 184, a ninth angle 169, and a tenth angle 170. The cross brace 123 is further defined with a fifth end 185 and a sixth end 186.

The first leg 121 is a stanchion that forms a portion of the load path created by the second support 104. The first leg 121 is formed with angles. The second leg 122 is a stanchion that forms a portion of the load path created by the second support 104. The second leg 122 is formed with angles. Methods to form angles in shafts are well known and documented in the mechanical arts. The cross brace 123 is a supporting strut that attaches the first leg 121 to the second leg 122.

The ninth angle 169 is an interior angle formed within the length of the second leg 122. The tenth angle 170 is an exterior angle formed within the length of the second leg 122. The eleventh angle 171 is an exterior angle formed within the length of the first leg 121. The arc of the eleventh angle 171 is identical to the tenth angle 170. The twelfth angle 172 is an interior angle formed within the length of the first leg 121. The arc of the twelfth angle 172 is identical to the ninth angle 169.

The ninth angle 169 is formed between the fourth end 184 of the second leg 122 and the tenth angle 170. The tenth angle 170 is formed between the third end 183 of the second leg 122 and the ninth angle 169. The eleventh angle 171 is formed between the first end 181 of the first leg 121 and the twelfth angle 172. The twelfth angle 172 is formed between the second end 182 of the first leg 121 and the eleventh angle 171.

The first folding joist 124 is a supporting apparatus that: 1) transfers the load of the second leaf 102 to the first leg 121; and 2) locks the first leg 121 in the open position when the first leg 121 is under a load. The second folding joist 125 is a supporting apparatus that: 1) transfers the load of the second leaf 102 to the second leg 122; and 2) locks the second leg 122 in the open position when the second leg 122 is under a load. The locking pivoting devices required to lock the first folding joist 124 and the second folding joist 125 in the open position are well known and documented in the mechanical arts.

The first folding joist 124 comprises a first shaft 126, a second shaft 127, a first pivot 131, a second pivot 132, and a third pivot 133. The first shaft 126 is further defined with a seventh end 187 and an eighth end 188. The second shaft 127 is further defined with a ninth end 189 and a tenth end 190. The first shaft 126 is a commercially available metal bar. The second shaft 127 is a commercially available metal bar.

The first pivot 131 is a commercially available fastening device that allows for the relative rotation of the elements to which it is attached. The second pivot 132 is a commercially available fastening device that allows for the relative rotation of the elements to which it is attached. The second pivot 132 further comprises a locking element. The second pivot 132 uses the cross brace 123 as the pivot point of the second pivot 132. The third pivot 133 is a commercially available fastening device that allows for the relative rotation of the elements to which it is attached. The fourth pivot 134 is a commercially available fastening device that allows for the relative rotation of the elements to which it is attached.

The second folding joist 125 comprises a third shaft 128, a fourth shaft 129, a fifth pivot 135, a sixth pivot 136, and a seventh pivot 137. The third shaft 128 is further defined with an eleventh end 191 and a twelfth end 192. The fourth shaft 129 is further defined with a thirteenth end 193 and a fourteenth end 194. The third shaft 128 is a commercially available metal bar. The fourth shaft 129 is a commercially available metal bar.

The fifth pivot 135 is a commercially available fastening device that allows for the relative rotation of the elements to which it is attached. The sixth pivot 136 is a commercially available fastening device that allows for the relative rotation of the elements to which it is attached. The sixth pivot 136 further comprises a locking element. The sixth pivot 136 uses the cross brace 123 as the pivot point of the sixth pivot 136. The seventh pivot 137 is a commercially available fastening device that allows for the relative rotation of the elements to which it is attached. The eighth pivot 138 is a commercially available fastening device that allows for the relative rotation of the elements to which it is attached.

The assembly of the invention 100 is described in the following 5 paragraphs.

The hinge 105 attaches the eighth edge 148 of the first leaf 101 and the sixteenth edge 156 of the second leaf 102 such that a flush horizontal surface is formed when the invention 100 is deployed for use.

The first pivot 131 attaches the seventh end 187 of the first shaft 126 to the second ring 115 such that the first shaft 126 will rotate freely around the first pivot 131. The second pivot 132 attaches the eighth end 188 of the first shaft 126 to the sixth end 186 of the second shaft 127 such that the first shaft 126 rotates freely relative to the second shaft 127. The third pivot 133 attaches the tenth end 190 of the second shaft 127 to the first leg 121 in the area of the eleventh angle 171 such that the second shaft 127 rotates freely relative to the first leg 121. The fourth pivot 134 attaches the first end 181 of the first leg 121 to the second ring 115 such that the first leg 121 will rotate freely around the fourth pivot 134.

The fifth pivot 135 attaches the eleventh end 191 of the third shaft 128 to the second ring 115 such that the third shaft 128 will rotate freely around the fifth pivot 135. The sixth pivot 136 attaches the twelfth end 192 of the third shaft 128 to the thirteenth end 193 of the fourth shaft 129 such that the third shaft 128 rotates freely relative to the fourth shaft 129. The seventh pivot 137 attaches the fourteenth end 194 of the fourth shaft 129 to the second leg 122 in the area of the tenth angle 170 such that the fourth shaft 129 rotates freely relative to the second leg 122. The eighth pivot 138 attaches the third end 183 of the second leg 122 to the second ring 115 such that the second leg 122 will rotate freely around the eighth pivot 138.

By rotating the second support 104 around the first pivot 131, the second pivot 132, the third pivot 133, the fourth pivot 134, the fifth pivot 135, the sixth pivot 136, the seventh pivot 137, and the eighth pivot 138 the second support 104 can be rotated into the second cavity 114 of the second leaf 102 for storage.

When the first cavity 111 and the second cavity 114 are placed against each other, a contained negative space is formed within which the first support 103 and the second support 104 are stored.

The following definitions were used in this disclosure:

Anchor: As used in this disclosure, anchor means to hold an object firmly or securely.

Anchor Point: As used in this disclosure, an anchor point is a location to which a first object can be securely attached to a second object.

Angle, Interior: As used in this disclosure, an interior angle is a cant that is formed in the perimeter of area wherein the angle of lesser arc that is formed by the cant faces the interior of the bounded area.

Angle, Exterior: As used in this disclosure, an exterior angle is a cant that is formed in the perimeter of area wherein the angle of lesser arc formed by the cant faces the exterior of the bounded area.

Arc: As used in this disclosure, an arc refers to a portion of a circumference or a curved perimeter. When applied to an angle, the arc also refers to a measure of an angular span as measured from a circle at the vertex formed by the sides of the angle.

Automobile: As used in this disclosure, an automobile is a road vehicle that that specializes in carrying passengers and light cargo loads. This definition is specifically intended to include vehicles generally referred to as pickup trucks, vans, minivans, and sport utility vehicles.

Cant: As used in this disclosure, a cant is an angular deviation from one or more reference planes such as a vertical plane or a horizontal plane.

Cavity: As used in this disclosure, a cavity is an empty space or negative space that is formed within an object.

Footprint: As used in this disclosure, a footprint is the surface area occupied by an object.

Flush: As used in this disclosure, the term flush is used to describe the alignment of a first surface and a second surface on a single plane.

Form Factor: As used in this disclosure, the term form factor refers to the size and shape of an object.

Grip: As used in this disclosure, a grip is an accommodation formed within an object that allows the object to be grasped by a hand.

Handle: As used in this disclosure, a handle is an object by which a tool, object, or door is held or manipulated with the hand.

Hinge: As used in this disclosure, a hinge is a device that permits the turning, rotating, or pivoting of a first object relative to a second object.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity.

Load Path: As used in this disclosure, a load path refers to a chain of one or more structures that transfers a load generated by a raised structure or object to a foundation or the earth.

Loop: As used in this disclosure, a loop is the length of a first linear structure that is joined at the ends forming an enclosed area.

Negative Space: As used in this disclosure, negative space is a method of defining an object through the use of open or empty space as the definition of the object itself, or, through the use of open or empty space to describe the boundaries of an object.

Perimeter: As used in this disclosure, a perimeter is one or more curved or straight lines that bounds an enclosed area on a plane or surface. The perimeter of a circle is commonly referred to as a circumference.

Piano Hinge: As used in this disclosure, a piano hinge is: 1) a hinge that is longer than 12 inches; and 2) has a pin that runs fully along at least one of the surfaces that the piano hinge is attached to. Piano hinges are also commonly referred to as continuous hinges.

Pivot: As used in this disclosure, a pivot is a rod or shaft around which an object rotates or swings.

Rectilinear: As used in this disclosure, rectilinear is an adjective that is used to describe an object that: 1) moves in a straight line or lines; 2) consists of a straight line or lines; 3) is bounded by a straight line or lines; or, 4) is otherwise characterized by a straight line or lines.

Ridge: As used in this disclosure, a ridge is an elevated or raised portion of a structure.

Rounded: A used in this disclosure, the term rounded refers to the replacement of an apex or vertex of a structure with a (generally smooth) curvature wherein the concave portion of the curvature faces the interior or center of the structure.

Superior: As used in this disclosure, the term superior refers to a directional reference that is parallel to and in the opposite direction of the force of gravity.

Supporting Surface: As used in this disclosure, a supporting surface is a horizontal surface upon which an object is placed. Within this disclosure, it is assumed that the object is placed on the supporting surface in an orientation that is appropriate for the normal or anticipated use of the object.

Vertex: As used in this disclosure, a vertex (plural vertices) is an angle that is formed by two lines that form a point. Vertices are commonly found in polygons.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A transportable collapsible furniture item comprising:
a first leaf, a second leaf, a first support, a second support, and a hinge;
wherein the hinge attaches the first leaf and the second leaf;
wherein the first support and the second support raise the first leaf and the second leaf above the supporting surface;
wherein the transportable collapsible furniture item is for use with a vehicle;
wherein the vehicle is further defined with a trunk;
wherein the trunk is further defined with a trunk floor;
wherein the transportable collapsible item forms a raised bottom surface that substitues for the trunk floor;
wherein the transportable collapsible furniture item can be deployed to form a table;
wherein the transportable collapsible furniture item is collapsible;
wherein the first leaf and the second leaf from a flush horizontal surface that forms the superior surface of the transportable collapsible furniture item;
wherein the first leaf is a hollow rectilinear block structure;
wherein an open face of the first leaf provides access into the hollow interior;
wherein the open face of the first leaf is the inferior face;
wherein the first leaf further comprises a first cavity, a first ring, and a first handle;
wherein the first cavity is formed by the first ring of the first leaf;
wherein the first leaf is further defined with a third edge, a fourth edge, a fifth edge, a sixth edge, a seventh edge, and an eighth edge;
wherein the first ring is a metal ridge structure that forms a loop that forms the exterior surfaces of the first leaf with the exception of the superior surface of the first leaf;
wherein the first handle is an aperture that is formed in the eighth edge of the first leaf;
wherein the second leaf comprises a second cavity, a second ring, and a second handle;
wherein the second cavity is formed by the second ring of the second leaf;

wherein the second leaf is further defined with a ninth edge, a tenth edge, an eleventh edge, a twelfth edge, a thirteenth edge, a fourteenth edge, a fifteenth edge, and a sixteenth edge;

wherein the second leaf is further defined with a fifth angle, a sixth angle, a seventh angle, and an eighth angle;

wherein the second ring is a metal ridge structure that forms a loop that forms the exterior surfaces of the second leaf with the exception of the superior surface of the second leaf;

wherein the second handle is an aperture that is formed in the sixteenth edge of the second leaf;

wherein the second leaf is a hollow rectilinear block structure;

wherein an open face of the second leaf provides access into the hollow interior;

wherein the open face of the second leaf is the inferior face;

wherein the second leaf is identical to the first leaf such that the first leaf and the second leaf form a symmetrical surface when the transportable collapsible furniture item is deployed;

wherein when the transportable collapsible furniture item is folded for storage, the second leaf aligns with the first leaf to form a unified rectilinear structure with flush surfaces;

wherein the fifth angle is an interior angle formed within the perimeter of the second leaf;

wherein the sixth angle is an exterior angle formed within the perimeter of the second leaf;

wherein the seventh angle is an exterior angle formed within the perimeter of the second leaf;

wherein the eighth angle is an interior angle formed within the perimeter of the second leaf;

wherein the fifth angle is formed at the vertex of the ninth edge and the tenth edge;

wherein the sixth angle is formed at the vertex of the tenth edge and the eleventh edge;

wherein the seventh angle is formed at the vertex of the thirteenth edge and the fourteenth edge;

wherein the eighth angle is formed at the vertex of the fourteenth edge and the fifteenth edge.

2. The transportable collapsible furniture item according to claim 1 wherein the hinge is piano hinge that attaches the first leaf to the second leaf such that the first leaf can rotate relative to the second leaf.

3. The transportable collapsible furniture item according to claim 2 wherein the first support is a structural component;
wherein the first support provides a load path from the first leaf to a supporting surface;
wherein the second support is a structural component;
wherein the second support provides a load path from the second leaf to a supporting surface;
wherein the first support is identical to the second support.

4. The transportable collapsible furniture item according to claim 3 wherein the second support comprises a first leg, a second leg, a cross brace, a first folding joist, a second folding joist, a fourth pivot, and an eighth pivot;
wherein the cross brace attaches the first leg to the second leg;
wherein the first joist attaches the first leg to the second ring;
wherein the second joist attaches the second leg to the second ring;

wherein the first leg is further defined with a first end, a second end, an eleventh angle, and a twelfth angle;
wherein the second leg is further defined with a third end, a fourth end, a ninth angle, and a tenth angle;
wherein the cross brace is further defined with a fifth end and a sixth end.

5. The transportable collapsible furniture item according to claim 4 wherein the first leg is a stanchion that forms a portion of the load path created by the second support;
wherein the second leg is a stanchion that forms a portion of the load path created by the second support.

6. The transportable collapsible furniture item according to claim 5 wherein the ninth angle is an interior angle formed within the length of the second leg;
wherein the tenth angle is an exterior angle formed within the length of the second leg;
wherein the eleventh angle is an exterior angle formed within the length of the first leg;
wherein the twelfth angle is an interior angle formed within the length of the first leg.

7. The transportable collapsible furniture item according to claim 6 wherein the arc of the eleventh angle is identical to the tenth angle;
wherein the arc of the twelfth angle is identical to the ninth angle;
wherein the ninth angle is formed between the fourth end of the second leg and the tenth angle;
wherein the tenth angle is formed between the third end of the second leg and the ninth angle;
wherein the eleventh angle is formed between the first end of the first leg and the twelfth angle;
wherein the twelfth angle is formed between the second end of the first leg and the eleventh angle.

8. The transportable collapsible furniture item according to claim 7 wherein the first folding joist is a supporting apparatus that transfers the load of the second leaf to the first leg;
wherein the first folding joist locks the first leg in the open position when the first leg is under a load;
wherein the second folding joist is a supporting apparatus transfers the load of the second leaf to the second leg;
wherein the second folding joist locks the second leg in the open position when the second leg is under a load.

9. The transportable collapsible furniture item according to claim 8 wherein the first folding joist comprises a first shaft, a second shaft, a first pivot, a second pivot, and a third pivot;
wherein the first shaft is further defined with a seventh end and an eighth end;
wherein the second shaft is further defined with a ninth end and a tenth end;
wherein the first shaft is a metal bar;
wherein the second shaft is a metal bar;
wherein the first pivot is a fastening device that allows for the relative rotation of the elements to which it is attached;
wherein the second pivot is a fastening device that allows for the relative rotation of the elements to which it is attached;
wherein the second pivot further comprises a locking element;
wherein the second pivot uses the cross brace as the pivot point of the second pivot;

wherein the third pivot is a fastening device that allows for the relative rotation of the elements to which it is attached;

wherein the fourth pivot is a fastening device that allows for the relative rotation of the elements to which it is attached.

10. The transportable collapsible furniture item according to claim 9 wherein the second folding joist comprises a third shaft, a fourth shaft, a fifth pivot, a sixth pivot, and a seventh pivot;

wherein the third shaft is further defined with an eleventh end and a twelfth end;

wherein the fourth shaft is further defined with a thirteenth end and a fourteenth end;

wherein the third shaft is a metal bar;

wherein the fourth shaft is a metal bar;

wherein the fifth pivot is a fastening device that allows for the relative rotation of the elements to which it is attached;

wherein the sixth pivot is a fastening device that allows for the relative rotation of the elements to which it is attached;

wherein the sixth pivot further comprises a locking element;

wherein the sixth pivot uses the cross brace as the pivot point of the sixth pivot;

wherein the seventh pivot is a fastening device that allows for the relative rotation of the elements to which it is attached;

wherein the eighth pivot is a fastening device that allows for the relative rotation of the elements to which it is attached.

11. The transportable collapsible furniture item according to claim 10 wherein the hinge attaches the eighth edge of the first leaf and the sixteenth edge of the second leaf such that a flush horizontal surface is formed when the transportable collapsible furniture item is deployed for use;

wherein the first pivot attaches the seventh end of the first shaft to the second ring such that the first shaft will rotate freely around the first pivot;

wherein the second pivot attaches the eighth end of the first shaft to the sixth end of the second shaft such that the first shaft rotates freely relative to the second shaft;

wherein the third pivot attaches the tenth end of the second shaft to the first leg in the area of the eleventh angle such that the second shaft rotates freely relative to the first leg;

wherein the fourth pivot attaches the first end of the first leg to the second ring such that the first leg will rotate freely around the fourth pivot;

wherein the fifth pivot attaches the eleventh end of the third shaft to the second ring such that the third shaft will rotate freely around the fifth pivot;

wherein the sixth pivot attaches the twelfth end of the third shaft to the thirteenth end of the fourth shaft such that the third shaft rotates freely relative to the fourth shaft;

wherein the seventh pivot attaches the fourteenth end of the fourth shaft to the second leg in the area of the tenth angle such that the fourth shaft rotates freely relative to the second leg;

wherein the eighth pivot attaches the third end of the second leg to the second ring such that the second leg will rotate freely around the eighth pivot.

12. The transportable collapsible furniture item according to claim 11 wherein by rotating the second support around the first pivot, the second pivot, the third pivot, the fourth pivot, the fifth pivot, the sixth pivot, the seventh pivot, and the eighth pivot the second support can be rotated into the second cavity of the second leaf for storage;

wherein when the first cavity and the second cavity are placed against each other, a contained negative space is formed within which the first support and the second support are stored.

* * * * *